(12) United States Patent
Yu et al.

(10) Patent No.: US 10,695,937 B2
(45) Date of Patent: Jun. 30, 2020

(54) DUST-FREE MULTIFUNCTIONAL CUTTING MACHINE AND ELECTRIC CUTTER

(71) Applicant: YONGKANG CONGZHEN TOOLS CO., LTD., Yongkang, Zhejiang (CN)

(72) Inventors: Mingcan Yu, Shanghai (CN); Huayi He, Zhejiang (CN); Hesheng Wu, Jiangxi (CN); Qirui Yu, Jiangxi (CN)

(73) Assignee: YONGKANG CONGZHEN TOOLS CO., LTD., Yongkang (CN)

( * ) Notice: Subject to any disclaimer, the term of this patent is extended or adjusted under 35 U.S.C. 154(b) by 147 days.

(21) Appl. No.: 15/805,166

(22) Filed: Nov. 7, 2017

(65) Prior Publication Data

US 2018/0311861 A1  Nov. 1, 2018

Related U.S. Application Data

(63) Continuation-in-part of application No. PCT/CN2017/082229, filed on Apr. 27, 2017.

(51) Int. Cl.

| | |
|---|---|
| *B27B 5/16* | (2006.01) |
| *B23D 59/00* | (2006.01) |
| *B27B 5/24* | (2006.01) |
| *B23D 45/04* | (2006.01) |

(52) U.S. Cl.
CPC ............ *B27B 5/165* (2013.01); *B23D 45/048* (2013.01); *B23D 59/006* (2013.01); *B27B 5/24* (2013.01)

(58) Field of Classification Search
CPC .... B23D 45/048; B23D 59/006; B27B 5/165; B27B 5/24; Y10T 83/7734
See application file for complete search history.

(56) References Cited

U.S. PATENT DOCUMENTS

| 5,074,044 A * | 12/1991 | Duncan | B23D 59/006 125/13.01 |
| 5,513,548 A * | 5/1996 | Garuglieri | B23D 45/068 83/397 |
| 8,201,335 B2 * | 6/2012 | Martin | B23D 59/006 30/124 |
| 2006/0201299 A1 * | 9/2006 | Santa Ana | B23D 45/024 83/468.3 |
| 2018/0071942 A1 * | 3/2018 | Behr | B23D 45/048 |
| 2018/0297132 A1 * | 10/2018 | Xu | B27B 5/165 |

FOREIGN PATENT DOCUMENTS

| CN | 103786193 A | 5/2014 |
| WO | WO-2018195868 A2 * | 11/2018 |

\* cited by examiner

*Primary Examiner* — Stephen Choi

(57) ABSTRACT

A dust-free multifunctional cut machine, including a worktable board, a machine case carrying the worktable board, a rod assembly arranged on the top of the worktable board, a frame and a cutting assembly comprising a cutting blade and a motor for driving the cutting blade for rotation, and a dust suction assembly arranged between the output shaft end of the motor and a cutting blade and having a spiral casing and a dust suction vane, wherein, the spiral casing includes a dust suction inlet and a dust exhaust outlet, the rod assembly includes a rod fixture and a slide bracket, the frame is connected with the slide bracket through the frame rotating seat and the frame moves back and forth through the rod with the use of the slide bracket. The dust-free multifunctional saw has three functions including bench sawing, miter sawing and automatic dust collection.

4 Claims, 10 Drawing Sheets

DUST-FREE MULTIFUNCTIONAL CUTTING MACHINE AND ELECTRIC CUTTER

CROSS-REFERENCE TO RELATED APPLICATIONS

The present application is a continuation-in-part application of PCT application No. PCT/CN2017/082229 filed on Apr. 27, 2017, the contents of which are hereby incorporated by reference.

TECHNICAL FIELD

The Invention relates to a dust-free multifunctional cutting machine and an electric cutter thereof, belonging to the technical field of dust-free cutting machines.

BACKGROUND

With the improvement of residential conditions, wooden products are widely adopted in domestic decoration and wooden handcrafts are more and more popular. When the wooden products are prepared with traditional tools, the wood cuttings and dusts are directly discharged into the air, causing severe air pollution, furniture damage and serious personal harm to the operator; additionally, it is difficult to eliminate the residual dusts, which will bring hazards to residents if such dusts remain indoor in a long time. Recently, some saws with dust collection function, i.e., dust-free saws, gradually appear in the market, which can avoid flying wood cuttings and keep a clean and healthy working environment.

For example, Chinese patent (Publication No.: CN103786193A; Application No.: 201210435897.1) has disclosed a bench saw, which comprises a machine case, an operation board, a worktable board, a swing piece and a rotary sway piece mounted with a saw blade and a motor. Wherein the rotary sway piece and the swing piece are hinged together; the swing piece coordinates with the operation board by means of sliding the arc surface that takes the intersecting line of the worktable board and the saw blade as the axle center. Although this invention has lifting function and angle regulation function, it has no dust collection function and will cause flying wood cuttings and environmental pollution.

Bench saws and miter saws on the market are normally of single function. The miter saw cannot realize the dust collection function in the prior art. The so called dust-free bench saw has a poor dust collection function. Some even need a separate automatic dust suction motor which causes higher cost, while some are added with an automatic dust suction vane, generally driven by belt, under the motor bottom, so the structure is complex.

In summary, to solve the above technical problems, it is urgent to invent a dust-free multifunctional saw integrating with the functions of bench saw and miter saw and dust collection and characterized by a simple structure with high cutting and suction efficiency.

SUMMARY OF THE INVENTION

The Invention proposes a dust-free multifunctional cutting machine integrating with the functions of bench saw and miter saw and dust collection and characterized by a simple structure with high cutting and suction efficiency, and can solve the problems of the prior art.

To realize the above functions, the Invention discloses the following technical scheme:

A dust-free multifunctional cutting machine, comprising a worktable board, a machine case carrying the worktable board, a rod assembly arranged on the top of the worktable board, a frame and a cutting assembly comprising a cutting blade and a motor for driving the cutting blade, and an automatic dust suction assembly arranged between the output shaft end of the motor and the cutting blade; the rod assembly comprises a rod fixture and a slide bracket, the frame is connected with the slide bracket through the frame rotating seat, the frame moves back and forth through the rod with the use of the slide bracket, and the frame is connected with the cutting assembly, a switching handle, an upper handle, and a lower handle, the cutting assembly moves back and forth through the rod with the use of the slide bracket for a longer cutting distance and perform miter sawing by rotating in the left and right angles with the use of the frame rotating seat; the automatic dust suction assembly comprises a spiral casing, a vane, a dust suction inlet and a dust exhaust outlet;

the dust-free multifunctional cutting machine has three functions including bench sawing, miter sawing and automatic dust collection.

For bench sawing, locking the slide bracket with a rod positioning knob firstly, rotating the cutting assembly to the required angle via the frame rotating seat, locking the cutting assembly with the locking handle, and pressing down the frame to the lowest position, inserting the switching handle to the corresponding position of the frame after unlocking and lock the frame, switching a blade follower switching mechanism to bench sawing mode and locking the blade follower switching mechanism (i.e. rotating a blade follower support plate, adjusting and locking the blade follower) and starting the switch to perform bench sawing.

For miter sawing, drawing away the switching handle; at this time, the frame lifts up automatically under the action of a torsional spring in a frame swivel pin; and then switching the blade follower switching mechanism to miter sawing mode and locking the blade follower switching mechanism with a locking handle after the cutting assembly rotates to the required angle via the frame rotating seat. The worktable board must be mounted on the top with a stopper assembly. The stopper assembly may rotate within the scope of 45°. The operator may select the expected angle to meet the cutting requirements of different angles, and start the switch to perform miter sawing.

The cut machine can realize the automatic dust collection function for either bench sawing or miter sawing after a dust suction hose and a dust exhaust tube are connected, i.e. all cuttings can be absorbed into the dust collection bag automatically.

Further, the cutting assembly comprises an outer hood A, a blade guard, an inner hood A, a cutting blade, an inner hood B, a spiral casing A, an outer hood B, a spiral casing B and a motor connected in turn from left to right, wherein, a dust suction vane is arranged between the spiral casings A and B, the motor is provided with an output shaft connected with the cutting blade and the dust suction vane.

Further, the frame is connected with an upper handle and a lower handle, and the upper handle and the lower handle are provided with a switch and a junction box respectively; an unlocking push rod with the self-locking function of inner hood is mounted on the upper handle. To press down the handle, the unlocking push rod shall be pulled firstly, and the self-locking function can ensure safety.

Further, the spiral casing A is provided inside with a blade follower assembly composed of a blade follower switching mechanism, a blade follower support plate and a blade follower connected in turn; for bench sawing function, the operator is suggested to adjust the blade follower to the lower part of the blade guard, and for miter sawing, to adjust and conceal the blade follower in the blade guard.

Further, the dust-free multifunctional saw also comprises a dust suction assembly respectively connected with the cutting assembly and the machine case, and the dust suction assembly is composed of a dust exhaust tube and a dust suction hose;

Further, the spiral casing is provided with a dust exhaust outlet, a primary dust suction inlet, and a first dust suction tube; one end of the dust exhaust tube is connected with the dust exhaust outlet, and the other end of the dust exhaust tube is connected with the dust collection bag via a dust exhaust tube joint and a dust exhaust tube of the dust collection bag.

Further, a dust collection box is arranged under the worktable board; one end of the dust suction hose is connected with the dust collection box while the other end of the dust suction hose is connected with the first dust suction tube, effectively preventing leakage of wood cuttings under the worktable into the machine case. With the adoption of flexible dust suction connecting hose, it will not deform in the course of angle regulation of the dust-free saw, the service life of the dust suction flue may be extended and the leakproofness may be guaranteed during the operation of the dust-free saw.

Further, part of the cuttings generated from the material cut by the cutting blade are absorbed by the dust collection box and then into the first dust suction tube via the dust suction hose, and other cuttings are absorbed into the second dust suction tube via a dust pilot flue composed of outer hoods on both sides of the cutting blade, and then into the dust exhaust outlet through the dust suction vane, and discharged into the dust collection bag via the dust exhaust outlet and dust exhaust tube.

Further, an electric cutter is provided by the Invention, which uses the aforementioned dust suction assembly, wherein a dust suction and exhaust structure of the dust suction assembly is arranged between the output end of the motor of the electric saw and the working parts of the electric saw; the electric saw is an automatic dust collection miter saw or automatic dust collection bench saw or automatic dust collection complex saw or portable automatic dust collection electric tool.

The advantages and beneficial effects of the Invention are as follows:

1. The dust-free multifunctional cutting machine that the Invention relates to will collect the wood cuttings generated in the working process into the dust collection bag through the flexible connecting hose by using the dust collection box under the machine case, the spiral casing and dust suction vane device arranged at the front end of the drive motor, by using the pressure difference generated from high-speed rotation of the dust suction vane. The dust collection bag is secured on the machine case in a flexible connection way for simple and easy cleaning.

2. The Invention can realize free switching between bench sawing and miter sawing by means of the self-locking and unlocking functions of the switching handle. The whole blade guard is composed of the inner hoods and the outer hoods and can realize the safety protection function during bench sawing and miter sawing.

3. With the cutting assembly (comprising a cutting blade) on the worktable and the dust suction assembly, the Invention can realize multiple functions with one machine integrating with bench saw, miter saw and automatic dust collection, easy and fast switching between bench saw and miter saw, cutting wooden products free of any dust, thus ensuring the operator's physical and mental health and good operation environment.

BRIEF DESCRIPTION OF THE DRAWINGS

In order to illustrate the technical schemes in the embodiments of the Invention or in prior art more clearly, the drawings required in description of the embodiments or prior art will be introduced briefly as follows. Obviously, the drawings described below are just a part of the embodiments of the Invention. A person skilled in the art is able to obtain other drawings according to these drawings without any creative work.

The parts in the figures are described as follows, 1—Outer hood A; 2—Blade guard; 3—Inner hood A; 4—Cutting blade; 5—Blade follower switching mechanism; 6—Blade follower; 7—Blade follower support plate; 8—Blade follower assembly; 9—Inner hood B; 10—Spiral casing A; 11—Outer hood B; 12—Saw blade drive shaft; 13—Dust suction vane; 14—Unlocking push rod; 15—Dust exhaust tube; 16—Spiral casing B; 17—Frame; 18—Junction box; 19—Frame swivel pin; 20—Switch; 21—Upper handle; 22—Lower handle; 23—Laser box seat; 24—Frame rotating seat; 25—Slide bracket; 26—Rod positioning knob; 27—Rod fixture; 28—Dust suction hose; 29—Switching handle; 30—Motor; 31—Locking handle; 32—Stopper; 33—Worktable board; 34—Dust exhaust tube joint; 35—Parallel guide ruler; 36—Dust collection box; 37—Dust suction elbow; 38—Machine case; 39—Dust collection bag; 40—Seal plate of dust collection bag; 41—Dust exhaust tube of the dust collection bag; 42—Dust pilot flue; 43—Dust exhaust outlet; 44—First dust suction tube; 45—Second dust suction tube; 46—Primary dust suction inlet.

DETAILED DESCRIPTION OF THE PREFERRED EMBODIMENTS

The Invention is further described in combination with drawings and embodiments as follows. It shall be noted that, these embodiments are described for providing further understanding of the Invention, and do not form an restriction therefor. Moreover, the technical features related to the embodiments of the Invention described as follows can combine with each other when they are not conflicted to each other.

Embodiment 1

Figure 1:
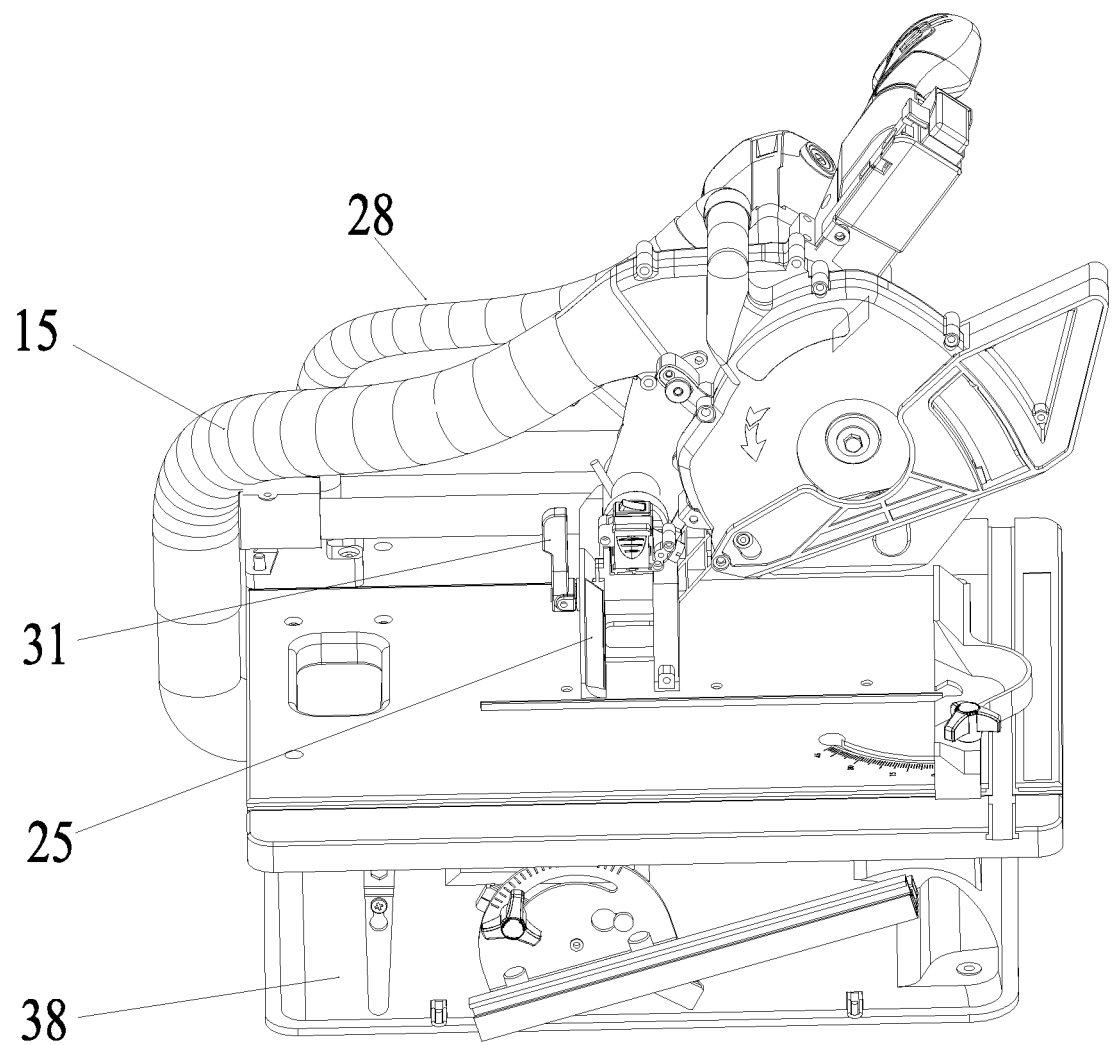
FIG. 1 is the structural diagram of the multifunctional cutting machine of Embodiment 1 of the Invention (1)
Figure 2:
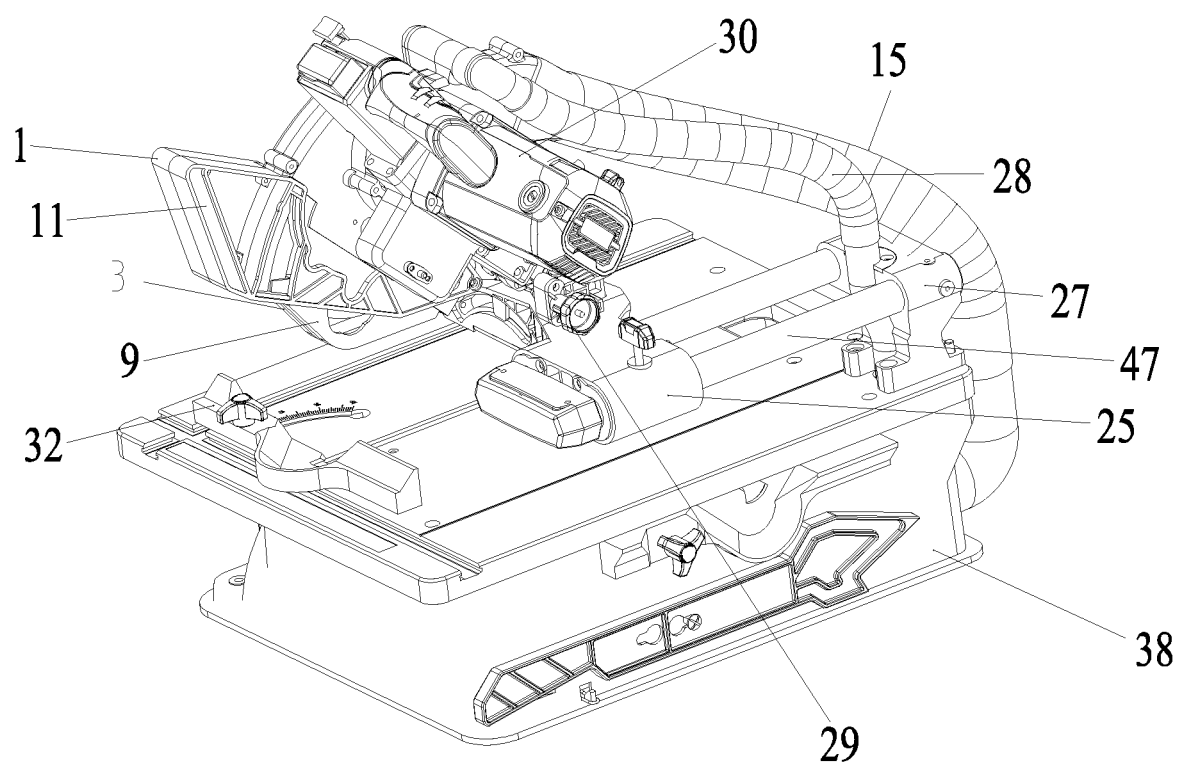
FIG. 2 is the structural diagram of the multifunctional cutting machine of Embodiment 1 of the Invention (2)
Figure 3:
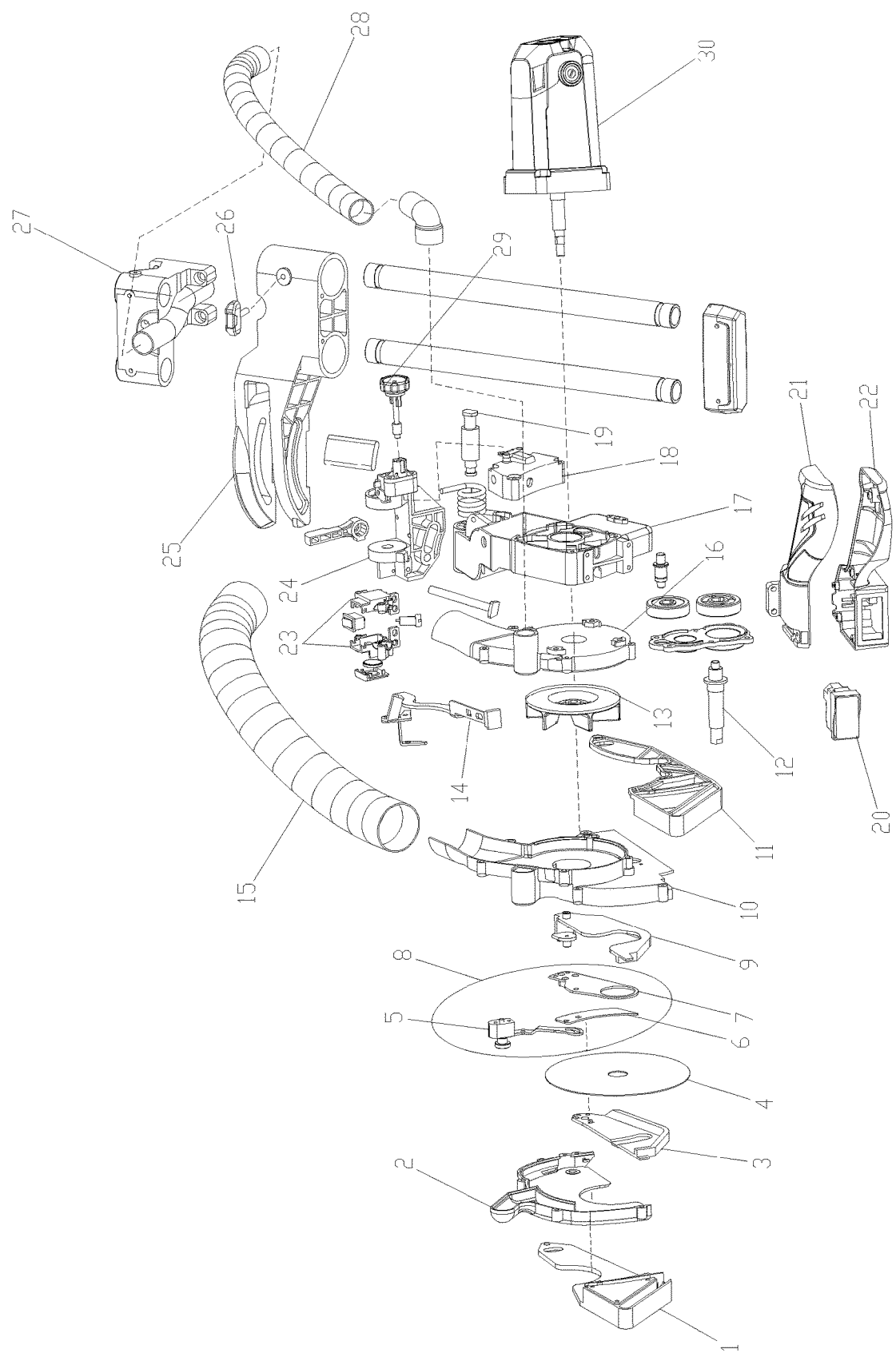
FIG. 3 is the structural diagram of the upper structure of the multifunctional cutting machine of Embodiment 1 of the Invention.
Figure 4:
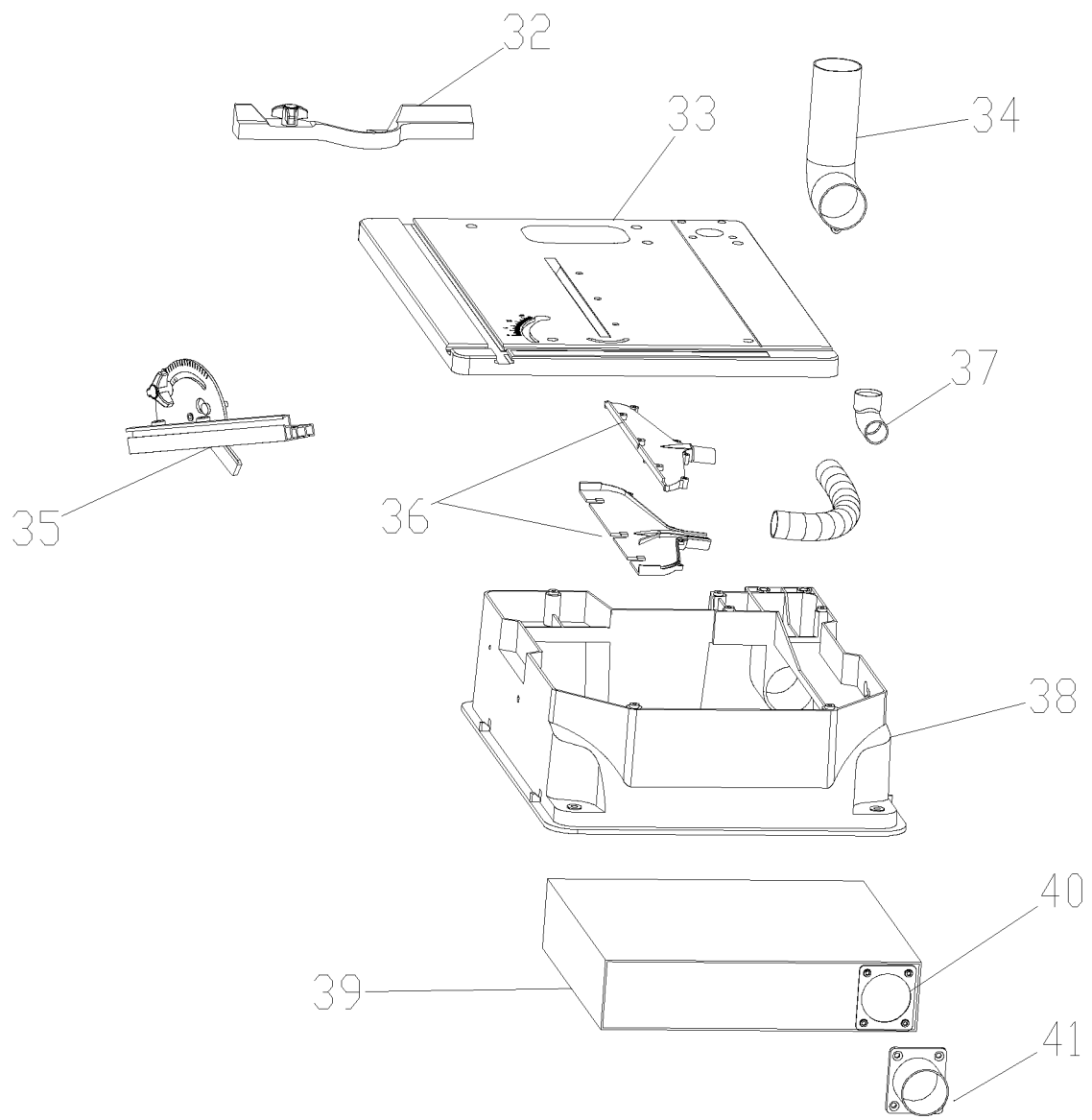
FIG. 4 is the structural diagram of the lower structure of the multifunctional saw of Embodiment 1 of the Invention.

Please refer to the structural diagrams 1 and 2 of a dust-free multifunctional saw as shown in FIG. 1 and FIG. 2. A dust-free multifunctional cutting machine, comprising a worktable board 33, a machine case 38 carrying the worktable board 33, a rod assembly arranged on the top of the worktable board 33, a frame 17 and a cutting assembly comprising a cutting blade 4 and a motor 30 for driving the cutting blade; the rod assembly comprises a rod 47, a rod fixture 27 and a slide bracket 25, the frame 17 is connected with the slide bracket 25 through a frame rotating seat 24, the frame 17 moves back and forth through the rod 47 with the use of the slide bracket 25, the frame 17 is connected with a cutting assembly, a switching handle 29, an upper handle 21, and a lower handle 22, the cutting assembly moves back and forth through the rod with the use of the slide bracket 25 for a longer cutting distance and performs miter sawing by rotating in the left and right angles with the use of the frame rotating seat 24;

The dust-free multifunctional cutting machine has three functions including bench sawing, miter sawing and automatic dust collection:

For bench sawing, the operator is suggested to lock the slide bracket 25 with a rod positioning knob 26 firstly, rotate the cutting assembly to the required angle via the frame rotating seat 24, lock the cutting assembly with the locking handle 31, and press down the frame 17 to the lowest position, insert the switching handle 29 to the corresponding position of the frame 17 after unlocking and lock the frame 17, switch a blade follower switching mechanism 5 to bench sawing mode and lock it (i.e., rotate the blade follower support plate 7, adjust the blade follower 6 and lock it) and start the switch 20 to perform bench sawing.

For miter sawing, the operator is suggested to draw away the switching handle 29; at this time, the frame 17 lifts up automatically under the action of a torsional spring in a frame swivel pin 19; and then the operator is suggested to switch the blade follower switching mechanism 5 to miter sawing mode and lock it, and then unlock with a rod positioning knob 26, a stopper 32 must be mounted on the worktable board 33. The stopper 32 may rotate within the scope of 45°, and start the switch 20 to perform miter sawing With respect to the automatic dust collection function, regardless of bench sawing or miter sawing function, the vane 13 in the spiral casing rotates at a high speed to automatically absorb the cuttings into the dust collection bag 39 through the dust suction flue in the dust suction hose 28 and the blade guard 2, and the dust pilot flue in the outer hood A 1 and the outer hood B 11, and the dust exhaust tube 15.

As shown in FIG. 3-FIG. 7, the cutting assembly comprises an outer hood A 1, a blade guard 2, an inner hood A 3, a cutting blade 4, an inner hood B 9, a spiral casing A 10, an outer hood B 11, a spiral casing B 16 and a motor 30 connected in turn from left to right, wherein, the spiral casings A 10 and B 16 are correspondingly provided with a dust suction vane 13, the output end of the motor 30 directly drives the dust suction vane 13, and drives the saw blade drive shaft 12 through gears, and the cutting blade 4 is mounted on the saw blade drive shaft 12.

The frame 17 is connected with an upper handle 21 and a lower handle 22, and the upper handle 21 and the lower handle 22 are provided with a switch 20 respectively; the unlocking push rod 14 with the self-locking function of inner hood is mounted on the upper handle 21. To press down the handle, the unlocking push rod 14 is pulled firstly, and the self-locking function can ensure safety.

Figure 5A:
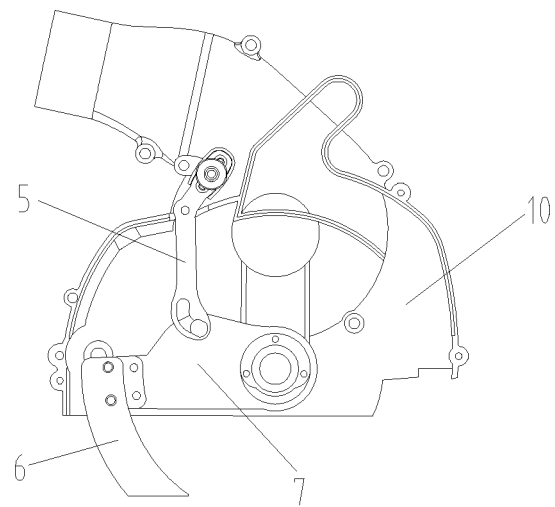
FIG. 5A is the structural diagram of the blade follower assembly of the multifunctional cutting machine in the state of bench sawing of Embodiment 1 of the Invention.
Figure 5B:
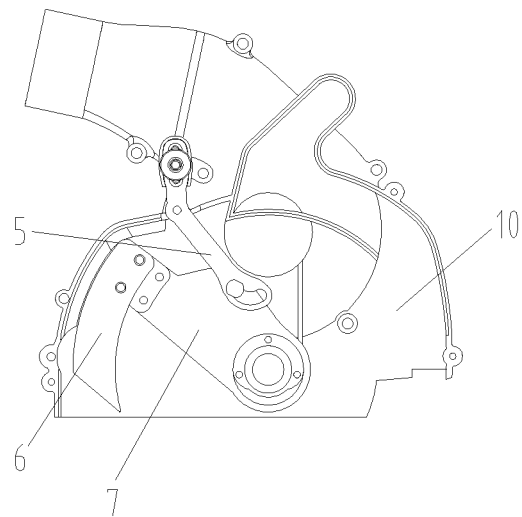
FIG. 5B is the structural diagram of the blade follower assembly of the multifunctional cutting machine in the state of miter sawing of Embodiment 1 of the Invention.
Figure 6:
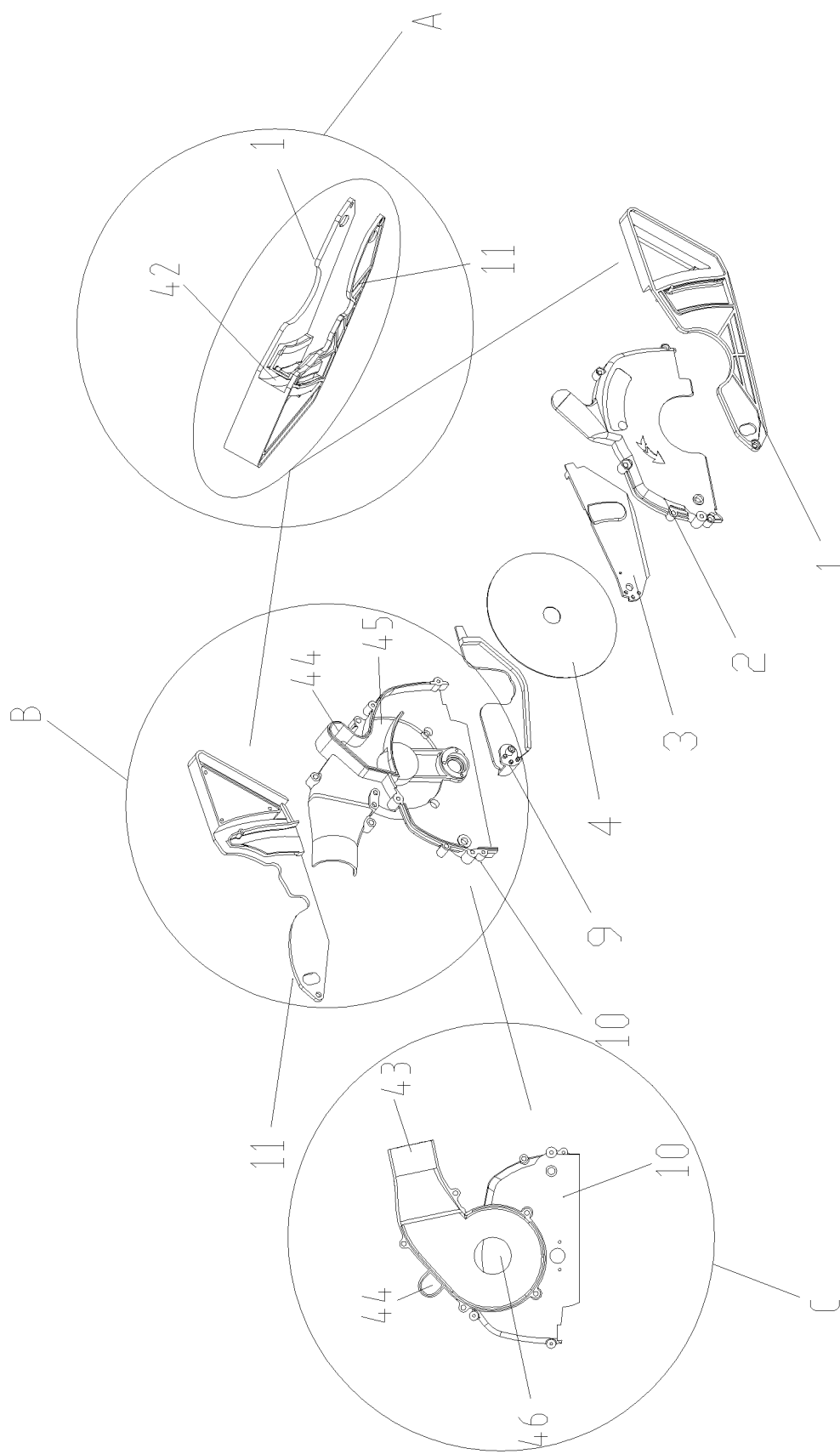
FIG. 6 is the structural diagram of the dust suction flue of multifunctional cutting machine of Embodiment 1 of the Invention.
Figure 6A:
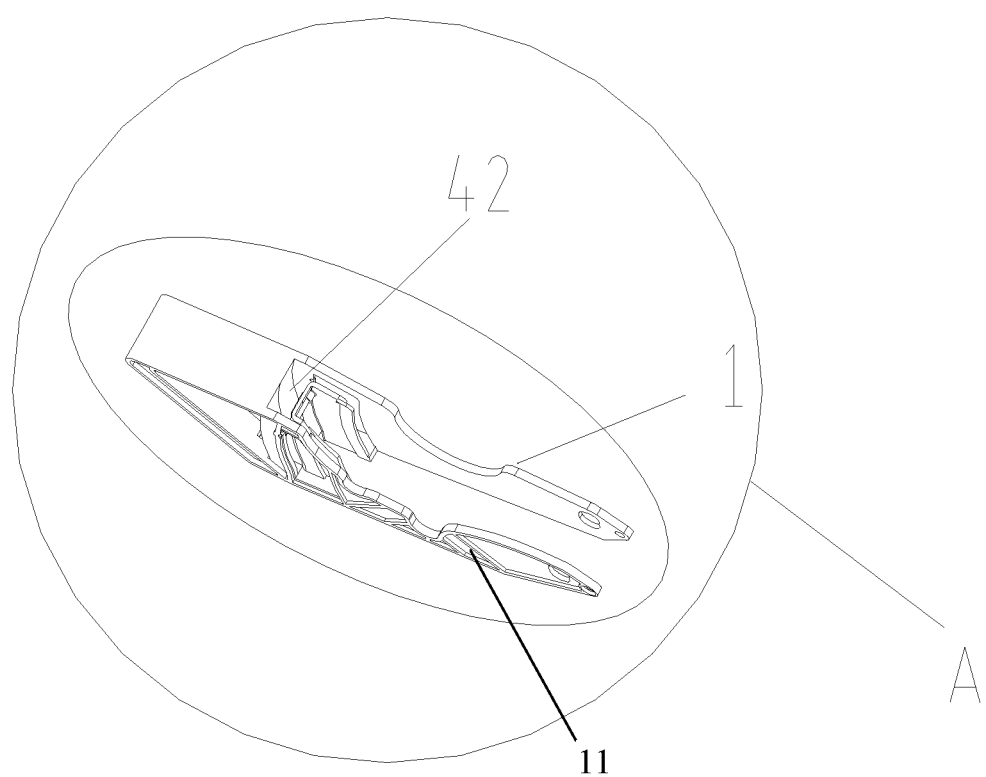
FIG. 6A is an enlarged view of A portion in FIG. 6.
Figure 6B:
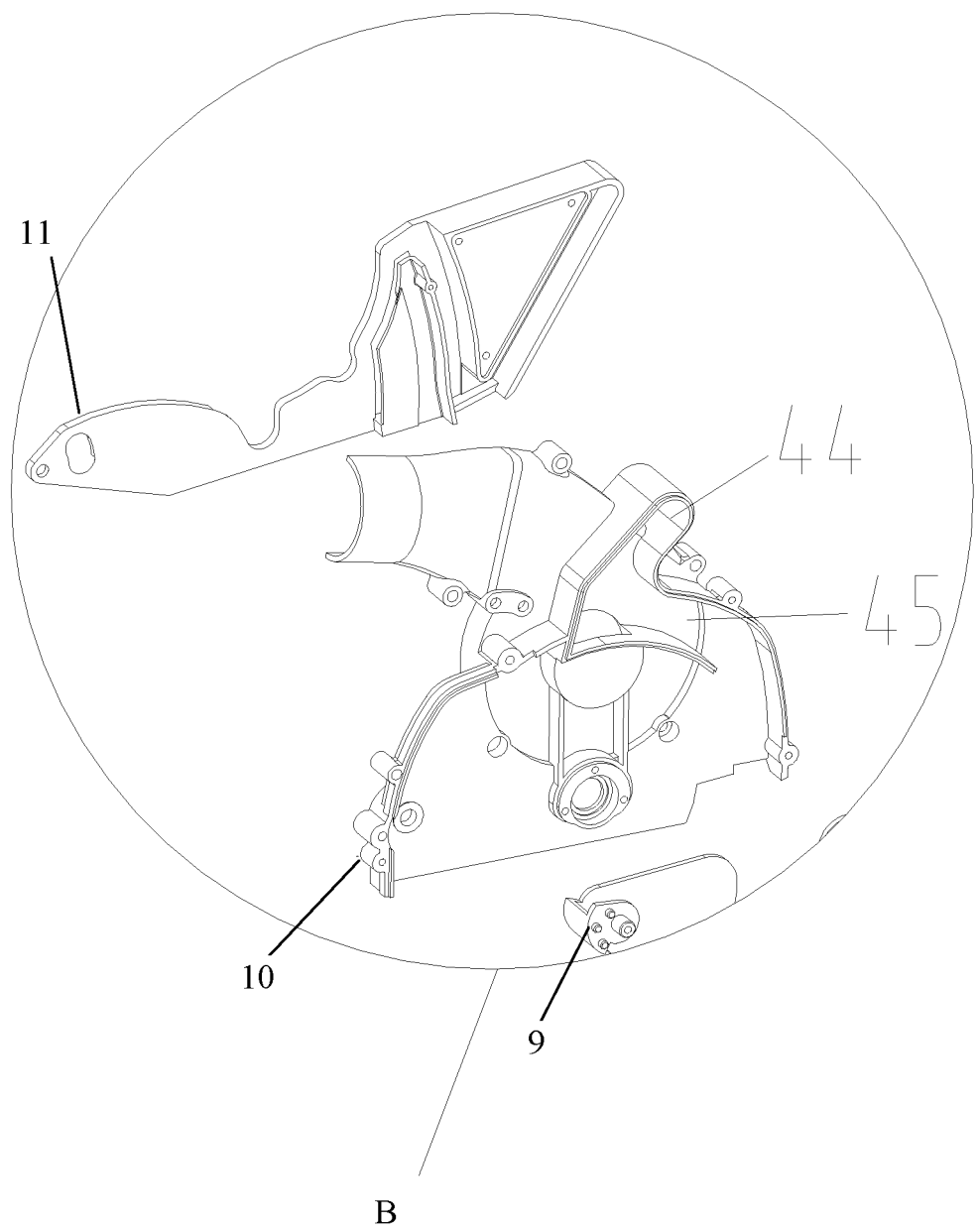
FIG. 6B is an enlarged view of B portion in FIG. 6.
Figure 6C:
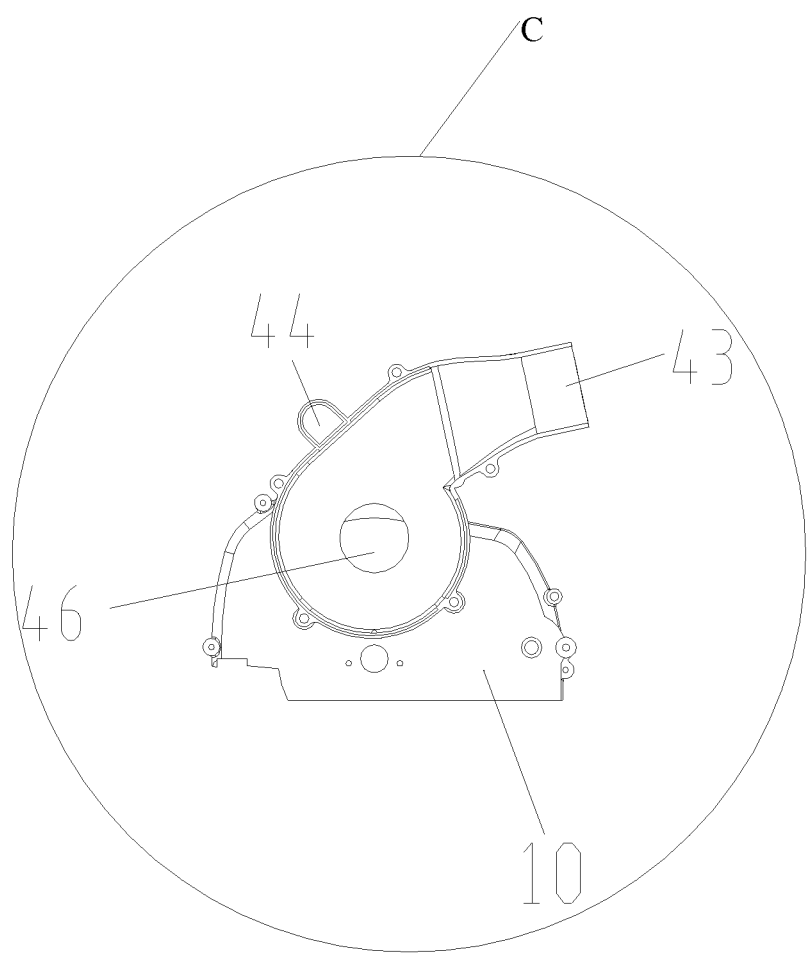
FIG. 6C is an enlarged view of C portion in FIG. 6.
Figure 7:
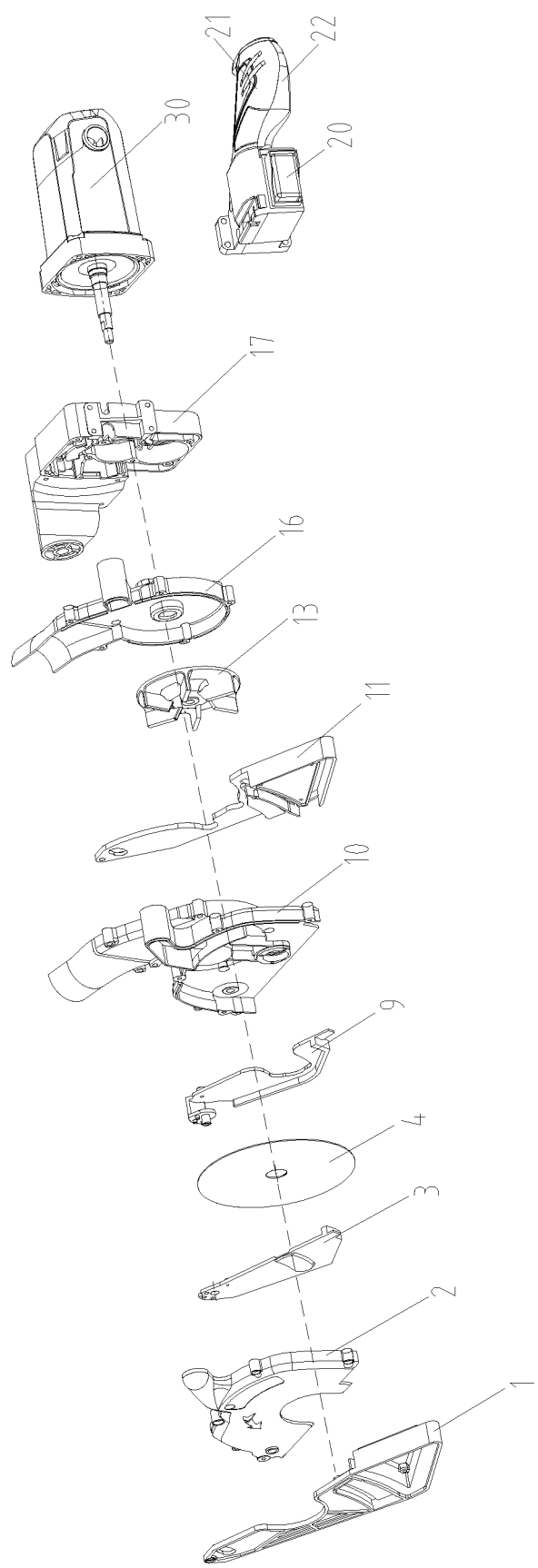
FIG. 7 is the structural diagram of the cutting assembly of the multifunctional cutting machine of Embodiment 1 of the Invention.

As shown in FIG. 5A and FIG. 5B, the spiral casing A 10 is provided inside with a blade follower assembly 8 composed of a blade follower switching mechanism 5, and a blade follower 6, and a blade follower support plate 7 connected in turn; for bench sawing function, the operator is suggested to adjust the blade follower 6 to the lower part of the blade guard 2, and for miter sawing, to adjust the blade follower 6 to conceal the blade follower 6 in the blade guard 2.

The dust-free multifunctional cutting machine comprises a dust suction assembly respectively connected with the cutting assembly and the machine case 38, and the dust suction assembly further comprises a dust exhaust tube 15 and dust suction hose 28.

The spiral casing A 10 and spiral casing B 16 are correspondingly provided with a main spiral casing comprising a dust exhaust outlet 43, a main dust collection inlet 46, and a first dust suction hose 44, wherein, one end of the dust exhaust tube 15 is connected with the dust exhaust outlet 43, and the other end of the dust exhaust tube 15 is connected with the dust collection bag 39 via a dust exhaust tube joint 34 and a dust exhaust tube of the dust collection bag 41, and the dust collection bag 39 is fixed together with the dust exhaust tube of the dust collection bag 41 through the seal plate of dust collection bag 40.

A dust collection box 36 is arranged under the worktable board 33; one end of the dust suction hose 28 is connected with the dust collection box 36 through one end of a dust suction elbow 37 while the other end is connected with the first dust suction tube 44, effectively preventing leakage of wood cuttings under the worktable into the machine case 38. With the adoption of flexible dust suction connecting hose 28, it will not deform in the course of angle regulation of the dust-free cut machine, the service life of the dust suction flue may be extended and the leakproofness may be guaranteed during the operation of the dust-free cut machine. The machine case is provided with a parallel guide ruler 35.

Part of the cuttings generated from the material cut by the cutting blade 4 are absorbed by the dust collection box 36 and then into the first dust suction tube 44 via the dust suction hose 28, and other cuttings are absorbed into the second dust suction tube 45 via the dust pilot flue 42 composed of outer hoods on both sides of the cutting blade 4, and then into the dust exhaust outlet 46 through the dust suction vane 13, and discharged into the dust collection bag 39 via the dust exhaust outlet 43 and dust exhaust tube 15.

The frame rotating seat 24 is provided with a laser aligning assembly comprising a laser box 23 and laser head.

Both sides of the cutting blade 4 are provided with an inner hood A 3 and an inner hood B 9 and an inner hood A 1 and an outer hood B 11 which can realize protection and dust guiding functions during bench sawing and miter sawing. The inner hood A and the inner hood B are secured in the inner space formed by a spiral casing A 10 and a blade guard 2, and the outer hood A 1 and the outer hood B 11 are mounted outside the blade guard 2. The front end of the inner hood is inserted into the front-end dust guide flue of the outer hood. Under working state, the operator is suggested to switch the unlocking push rod 14 to unlock and relock the inner hood and outer hood and cut materials. On the contrary, unlocking push rod 14 jacks the hoods and the frame rotating seat 24, and the inner and outer hoods cannot be opened, but the cutting blade 4 is completely concealed for safety and protection functions.

Embodiment 2

Embodiment 2 of the Invention relates to an electric cutter, which uses the dust suction assembly stated in Embodiment 1, wherein, the dust suction and exhaust structure of the dust suction assembly is arranged between the output end of the motor of the electric cutter and the working parts of the electric cutter. The electric cutter is an automatic dust collection miter saw or automatic dust collection bench saw or automatic dust collection complex saw or portable automatic dust collection electric tool.

The above is a detailed description in combination with drawings for the embodiments of the Invention, but the embodiments of the Invention are not limited to it. For a person skilled in the art, various changes and amendments, replacements and deformations made under the premise of not departing from the spirit and essence of the Invention shall still fall within the protection scope of the Invention.

What is claimed is:

1. A dust-free multifunctional cutting machine, comprising a worktable board, a machine case carrying the worktable board, a rod assembly arranged on a top of the worktable board, a frame and a cutting assembly comprising a cutting blade and a motor for driving the cutting blade for rotation, wherein the rod assembly comprises a rod, a rod fixture and a slide bracket, the frame is connected with the slide bracket through a frame rotating seat, the frame moves back and forth through the rod with the use of the slide bracket, and the frame is connected with the cutting assembly, a switching handle, an upper handle, and a lower handle; and the dust-free multifunctional cutting machine has the functions of bench sawing and miter sawing;

wherein the dust-free multifunctional cutting machine is configured to operate for bench sawing by locking the slide bracket, pressing down the frame to a lowest position, inserting the switching handle to a corresponding position of the frame to lock the frame, and starting a switch to perform the bench sawing;

wherein the dust-free multifunctional cutting machine is configured to operate for miter sawing by drawing away the switching handle such that the frame lifts up automatically under an action of a torsional spring in a frame swivel pin; and starting the switch to perform the miter sawing;

wherein the cutting assembly comprises an outer hood A, a blade guard, an inner hood A, the cutting blade, an inner hood B, a spiral casing A, an outer hood B, a spiral casing B and the motor connected in turn from left to right, wherein, the spiral casings A and B are correspondingly provided with a main spiral casing in which a dust suction vane is arranged, the motor is provided with an output shaft connected with the cutting blade and the dust suction vane; and wherein the spiral casing A is provided inside with a blade follower assembly comprising a blade follower switching mechanism, a blade follower support plate, and a blade follower connected in turn; when the dust-free multifunctional cutting machine is configured to operate for bench sawing function, the blade follower switching mechanism is switched to a bench sawing mode, and the blade follower support plate is rotated to adjust the blade follower to a lower part of the blade guard, and when the dust-free multifunctional cutting machine is configured to operate for miter sawing, the blade follower switching mechanism is switched to a miter sawing mode, and the blade follower is adjusted to be concealed in the blade guard.

2. The dust-free multifunctional cut machine according to claim 1, wherein the dust suction assembly is connected with the cutting assembly and the machine case, and the dust suction assembly comprises a dust exhaust tube and a dust suction hose; one end of the dust exhaust tube is connected with a dust exhaust outlet, and the other end of the dust exhaust tube is connected with a dust collection bag via a dust exhaust tube joint and a dust exhaust tube of the dust collection bag.

3. The dust-free multifunctional cut machine according to claim 2, wherein a dust collection box is arranged under the worktable board, and one end of the dust suction hose is connected with the dust collection box while the other end of the dust suction hose is connected with a first dust suction tube.

4. The dust-free multifunctional cut machine according to claim 3, wherein, a part of cuttings generated from a material cut by the cutting blade is absorbed by the dust collection box and then into the first dust suction tube via the dust suction hose, and another part of the cuttings is absorbed into a second dust suction tube via a dust pilot flue composed of the outer hoods on both sides of the cutting blade, and then into the dust exhaust outlet through the dust suction vane, and discharged into the dust collection bag via the dust exhaust outlet and the dust exhaust tube.

* * * * *